(12) United States Patent
Yasugi et al.

(10) Patent No.: US 8,598,726 B1
(45) Date of Patent: Dec. 3, 2013

(54) WIND TURBINE GENERATOR SYSTEM AND CONTROL METHOD THEREFOR

(75) Inventors: Akira Yasugi, Tokyo (JP); Tsutomu Kii, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/524,615

(22) Filed: Jun. 15, 2012

Related U.S. Application Data

(63) Continuation of application No. PCT/JP2012/054655, filed on Feb. 24, 2012.

(51) Int. Cl.
*F03D 9/00* (2006.01)

(52) U.S. Cl.
USPC ........................................................ 290/44

(58) Field of Classification Search
USPC .......... 290/44, 54–55, 43, 52; 361/20–21, 28, 361/36
See application file for complete search history.

(56) References Cited

U.S. PATENT DOCUMENTS

| | | | | |
|---|---|---|---|---|
| 2,583,369 | A * | 1/1952 | Fumagalli | 290/44 |
| 7,756,609 | B2 | 7/2010 | Jurkat et al. | |
| 2006/0132993 | A1 * | 6/2006 | Delmerico et al. | 361/20 |
| 2007/0216164 | A1 * | 9/2007 | Rivas et al. | 290/44 |

| | | | |
|---|---|---|---|
| 2009/0033096 | A1 | 2/2009 | Jurkat |
| 2009/0033097 | A1 | 2/2009 | Jurkat |
| 2009/0234510 | A1 | 9/2009 | Helle et al. |

FOREIGN PATENT DOCUMENTS

| | | |
|---|---|---|
| JP | 2001-234845 A | 8/2001 |
| JP | 2003-511615 A | 3/2003 |
| JP | 2003-343416 A | 12/2003 |
| WO | WO 2008/055503 A2 | 5/2008 |

OTHER PUBLICATIONS

Japan Patent Office, "Decision to Grant a Patent for JP 2012-556730", Mar. 12, 2013.

* cited by examiner

*Primary Examiner* — Jean F Duverne
(74) *Attorney, Agent, or Firm* — Manabu Kanesaka; Kenneth M. Berner; Benjamin J. Hauptman

(57) ABSTRACT

An object is to suppress an output power reduction of a wind turbine generator system caused by a drop in the wind speed while the output power is being reduced according to an output-power reduction demand. When the output-power reduction demand to reduce the output power at an interconnection point to a predetermined output-power limit value is notified from a utility grid side, priorities are set such that higher priorities are given to wind turbines whose output powers are larger, and a preset minimum output-power value is set in output power commands for the wind turbines sequentially in descending order of priority, until the output power at the interconnection point reaches the output power limit value.

7 Claims, 8 Drawing Sheets

| j | WIND TURBINE |
|---|---|
| 1 | WIND TURBINE 10-4 |
| 2 | WIND TURBINE 10-7 |
| 3 | WIND TURBINE 10-2 |
| ⋮ | ⋮ |
| m | WIND TURBINE 10-i |
| ⋮ | ⋮ |
| n | WIND TURBINE 10-k |

WIND TURBINE GENERATOR SYSTEM AND CONTROL METHOD THEREFOR

CROSS REFERENCE TO RELATED APPLICATIONS

This is a continuation of International Application PCT/JP2012/054655, with an international filing date of Feb. 24, 2012, which is hereby incorporated by reference herein in its entirety.

TECHNICAL FIELD

The present invention relates to a wind turbine generator system and a control method therefor.

BACKGROUND ART

In a wind turbine generator system (wind farm) having a plurality of wind turbines, conventionally, there has been a demand from the grid side that reduces the output power to a predetermined value, in some cases. For example, U.S. Pat. No. 7,756,609 discloses a method in which, when an output-power reduction demand is issued, output power commands for the wind turbines are set in consideration of values obtained by proportionally dividing an output power reduction for the wind turbines and weighting values of the wind turbines.

CITATION LIST

Patent Literature

{PTL 1} U.S. Pat. No. 7,756,609

SUMMARY OF INVENTION

Technical Problem

However, in the above-described output-power reduction method, when the wind speed drops, the output power of each wind turbine may become smaller than the output power command set for that wind turbine, thus reducing the output power of the entire wind turbine generator system by the amount corresponding to an output power reduction demanded by the grid side or larger, in some cases.

The present invention provides a wind turbine generator system and a control method therefor, in which, even when a drop in wind speed occurs while the output power is being reduced according to an output-power reduction demand, it is possible to suppress an output power reduction of the entire wind turbine generator system caused by the drop in wind speed.

Solution to Problem

According to a first aspect, the present invention provides a wind turbine generator system equipped with a plurality of wind turbines, in which the output power from the wind turbines is supplied to a utility grid via a common interconnection point, the wind turbine generator system including: a priority setting section that sets priorities such that higher priorities are given to the wind turbines whose output powers are larger, when an output-power reduction demand to reduce the output power at the interconnection point to a predetermined output-power limit value is notified from the utility grid side; and an output-power command setting section that sets a predetermined minimum output-power value in output power commands for the wind turbines sequentially in descending order of priority, until the output power at the interconnection point reaches the output power limit value, in which the minimum output-power value is set to zero or a minimum output-power value at which the wind turbine can be continuously operated.

According to a second aspect, the present invention provides a wind-turbine-generator-system control method for a wind turbine generator system equipped with a plurality of wind turbines, in which the output power from the wind turbines is supplied to a utility grid via a common interconnection point, the method including: a priority setting step of setting priorities such that higher priorities are given to the wind turbines whose output powers are larger, when an output-power reduction demand to reduce the output power at the interconnection point to a predetermined output-power limit value is notified from the utility grid side; and an output-power command setting step of setting a predetermined minimum output-power value in output power commands for the wind turbines sequentially in descending order of priority, until the output power at the interconnection point reaches the output power limit value, in which the minimum output-power value is set to zero or a minimum output-power value at which the wind turbine can be continuously operated.

Advantageous Effects of Invention

According to the present invention, an advantage is afforded in that, even when a drop in wind speed occurs while the output power is being reduced according to an output-power reduction demand, it is possible to suppress an output power reduction of the entire wind turbine generator system caused by the drop in wind speed.

DESCRIPTION OF EMBODIMENTS

A wind turbine generator system and a control method therefor according to one embodiment of the present invention will be described below with reference to the drawings.

Figure 1:
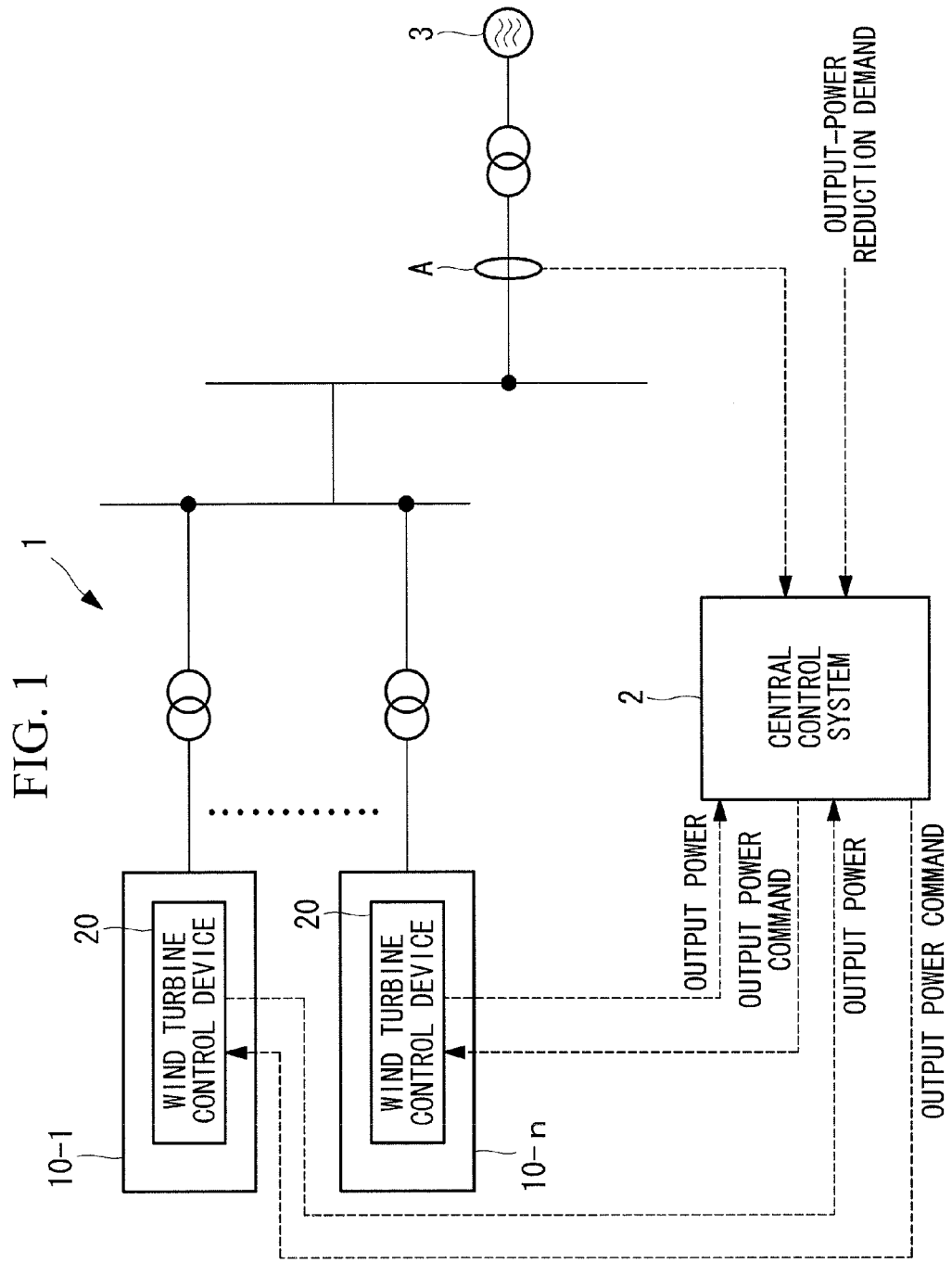
FIG. 1 is a diagram showing the entire configuration of a wind turbine generator system according to one embodiment of the present invention.

FIG. 1 is a diagram showing the entire configuration of the wind turbine generator system according to this embodiment. As shown in FIG. 1, a wind turbine generator system 1 includes a plurality of wind turbines 10-1, ..., 10-*n* (hereinafter, reference numeral "10" is simply assigned to indicate the wind turbines as a whole, and reference symbols "10-1", "10-*n*", and the like are assigned to indicate individual wind turbines) and a central control system 2 that gives output power commands to the wind turbines 10.

In this embodiment, the wind turbines 10 are variable-speed wind turbines whose individual rotational speeds can be controlled according to the wind speed. Electrical power output from each of the wind turbines 10 is supplied to a utility grid 3 through a corresponding electrical power line via a common interconnection point A.

Based on the demand output power and the demand frequency at the interconnection point A, which are notified from an electric power company control room (for example, an electric power company) that controls electric power in the utility grid 3, the central control system 2 sets output power commands for the wind turbines 10-1, ..., 10-*n*, such that the output power at the interconnection point A becomes the demand output power, for example, and sends them to wind turbine control devices 20 provided in the wind turbines 10-1, ..., 10-*n*. Thus, the output power of each of the wind turbines 10-1, ..., 10-*n* is controlled based on the corresponding output power command given by the central control system 2.

Furthermore, the central control system 2 performs output-power reduction control when an output-power reduction demand, which is a demand to reduce the output power at the interconnection point A to a predetermined output-power limit value, is notified from the electric power company control room. The details of the output-power reduction control will be described later.

Furthermore, the term "output power" mentioned above is intended to mean active power, for example.

Figure 2:
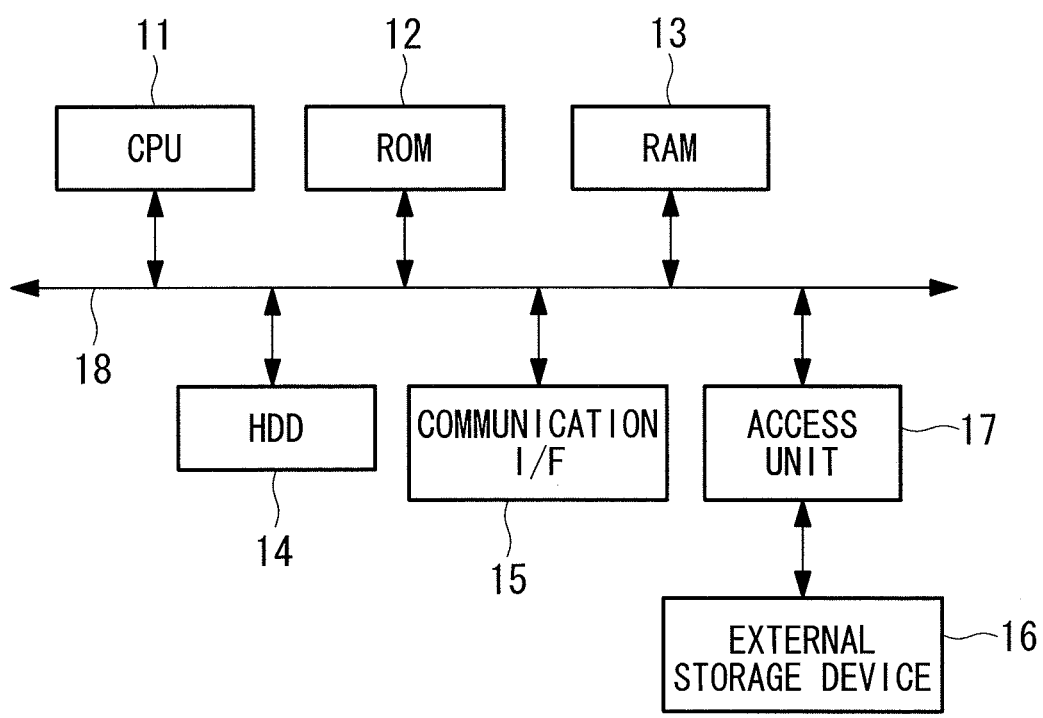
FIG. 2 is a diagram showing an example hardware configuration of a central control system shown in FIG. 1.

As shown in FIG. 2, the central control system 2 includes, for example, a CPU 11, a ROM (read only memory) 12 for storing a program to be executed by the CPU 11, a RAM (random access memory) 13 that functions as a working area when the program is executed, a hard disk drive (HDD) 14 serving as a large-capacity storage unit, a communication interface 15 for connecting to a network, and an access unit 17 to which an external storage device 16 is attached. These units are connected via a bus 18. Furthermore, the central control system 2 may include an input unit formed of a keyboard and a mouse, and a display unit formed of a liquid crystal display device that displays data.

The storage medium for storing the program executed by the CPU 11 is not limited to the ROM 12. For example, another auxiliary storage device, such as a magnetic disk, a magneto optical disk, and a semiconductor memory, may be used.

Figure 3:
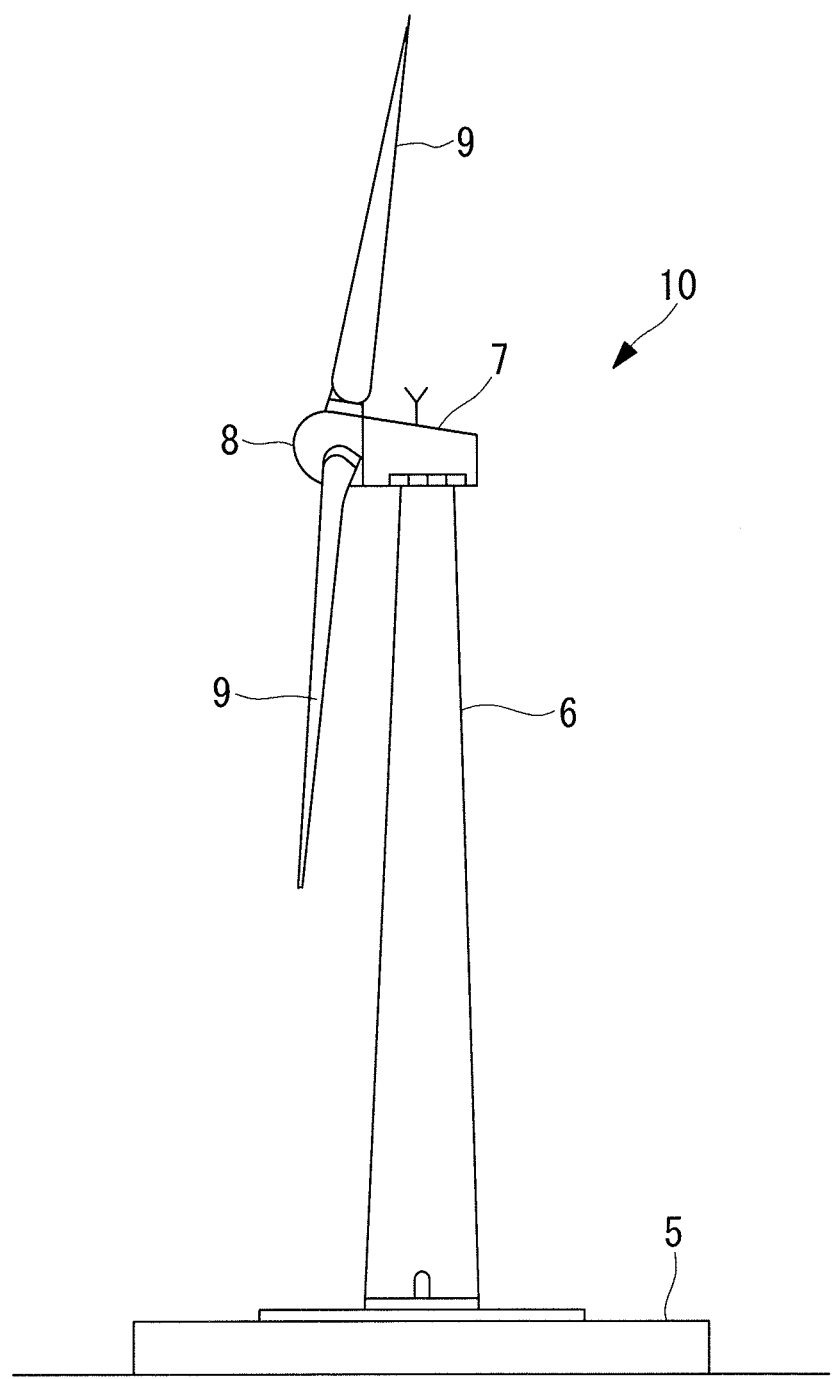
FIG. 3 is an outline view of each wind turbine shown in FIG. 1.
Figure 4:
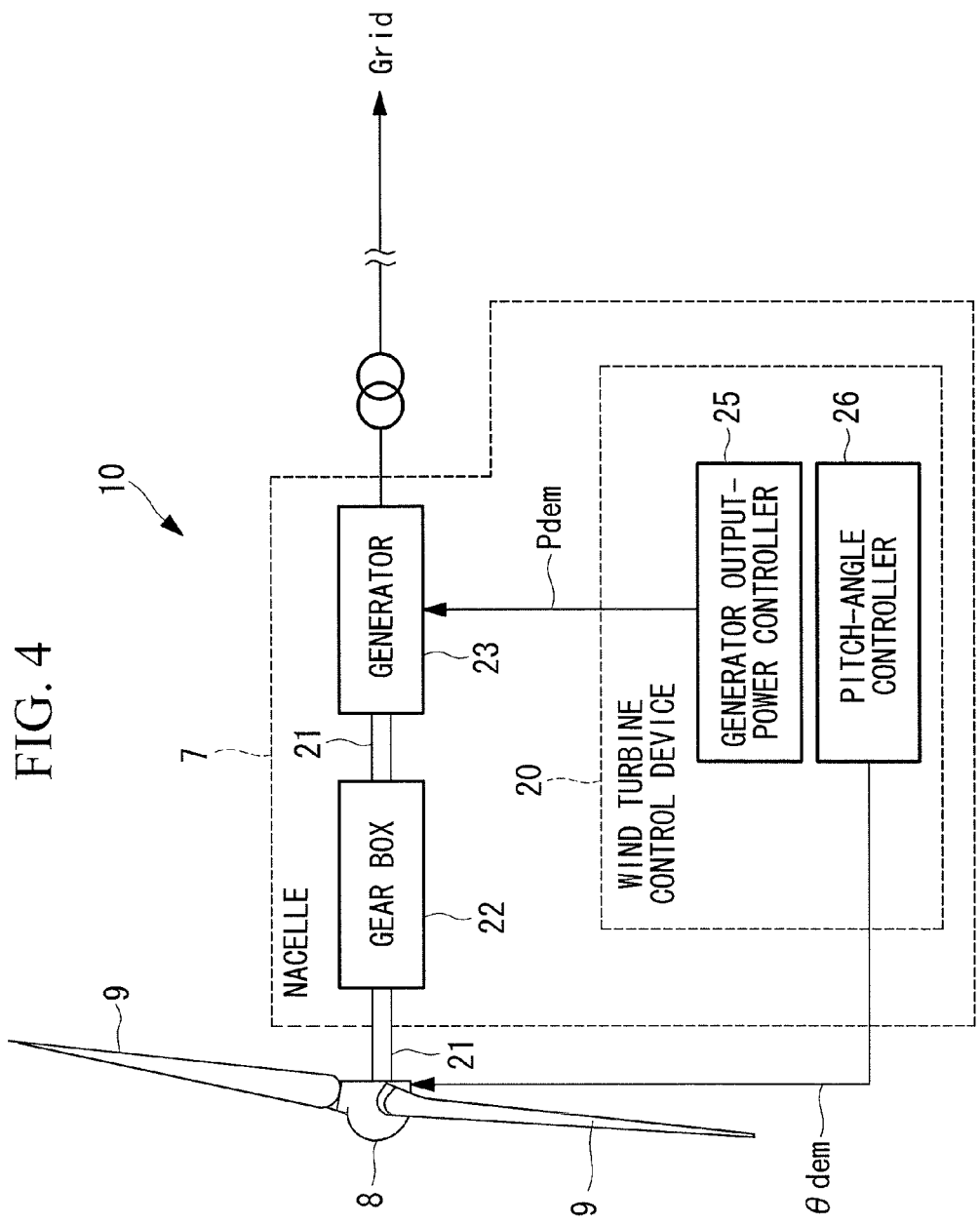
FIG. 4 is a schematic view showing, in outline, the electrical configuration of the wind turbine shown in FIG. 1.

FIG. 3 is an outline view of the wind turbine 10. FIG. 4 is a schematic view showing the electrical configuration of the wind turbine 10.

As shown in FIG. 3, the wind turbine 10 has a tower 6 provided upright on a foundation 5, a nacelle 7 provided on the top of the tower 6, and a rotor head 8 provided on the nacelle 7 so as to be capable of rotating about a substantially horizontal axis.

A plurality of blades 9 are attached to the rotor head 8 in a radiating pattern from the rotational axis of the rotor head 8. The blades 9 are coupled to the rotor head 8 so as to be capable of turning according to the operating conditions, so that the pitch angles of the blades 9 can be changed.

As shown in FIG. 4, a gear box 22 and a generator 23 are mechanically coupled to a rotational shaft 21 of the rotor head 8. The generator 23 may be a synchronous generator or an induction generator. A configuration in which the gear box 22 is not provided can be used.

The force of wind striking the blades 9 from the direction of the rotational axis of the rotor head 8 causes the rotor head 8 to rotate about the rotational axis, and the rotative force is increased in speed by the gear box 22 and is transferred to the generator 23 to be converted to electrical power.

The output power of the generator 23 is controlled by the wind turbine control device 20 installed in the nacelle 7.

The wind turbine control device 20 includes a generator output-power controller 25 and a pitch-angle controller 26.

The generator output-power controller 25 sets a generator output-power command Pdem for controlling the output power of the generator 23, based on the output power command received from the central control system 2, and sends it to the generator 23. For example, the generator output-power command Pdem is determined based on the output power command received from the central control system 2, the current output power of the generator 23, the rotational speed of the rotor head 8, the pitch angles of the blades 9, and the wind speed.

The generator 23 changes the output power based on the generator output-power command Pdem.

The pitch-angle controller 26 sets a pitch angle command θdem for controlling the pitch angles of the blades 9 and sends it to pitch actuators (not shown), installed in the rotor head 8, for changing the pitch angles. The pitch angle command θdem is determined based on the current pitch angles, the speed of wind received by the blades 9, and the rotational speed of the rotor head 8.

The pitch actuators change the pitch angles of the blades 9 based on the pitch angle command θdem.

Figure 5:
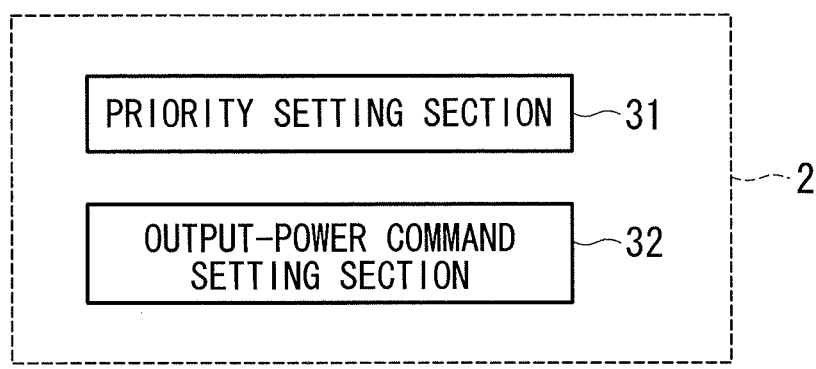
FIG. 5 is a functional block diagram mainly showing functions related to output-power reduction control among the functions of the central control system shown in FIG. 1.

Next, the output-power reduction control, which is performed by the central control system 2 when the output-power reduction demand is notified from the electric power control room, will be described. FIG. 5 is a functional block diagram mainly showing functions related to the output-power reduction control among the functions of the central control system 2. Furthermore, as shown in FIG. 1, information about the output power of each of the wind turbines 10-1, ..., 10-*n* is input to the central control system 2 from the corresponding wind turbine control device 20.

As shown in FIG. 5, the central control system 2 includes a priority setting section 31 and an output-power command setting section 32.

The priority setting section 31 sets priorities such that a higher priority is given to a wind turbine having larger output power, based on the information about the output power notified from the wind turbines 10-1, ..., 10-*n*.

The output-power command setting section 32 reduces the output power of each of the wind turbines to a preset minimum output-power value in descending order of priority until the output power at the interconnection point A reaches the predetermined output-power limit value, which is notified from the electric power control room.

Here, the minimum output-power value is set to zero (0 kW) or a minimum output-power value (for example, 480 kW) at which the wind turbine can be continuously operated.

Processing realized by the central control system 2 will be described below with reference to FIG. 6.

First, when the output-power reduction demand for reducing the output power to the predetermined output-power limit value is notified, it is determined whether the current output power Pkws at the interconnection point A (that is, the output power of the entire wind turbine generator system 1) is larger than a notified predetermined output-power limit value Pkwc (Step SA1).

Figures 7, 8:
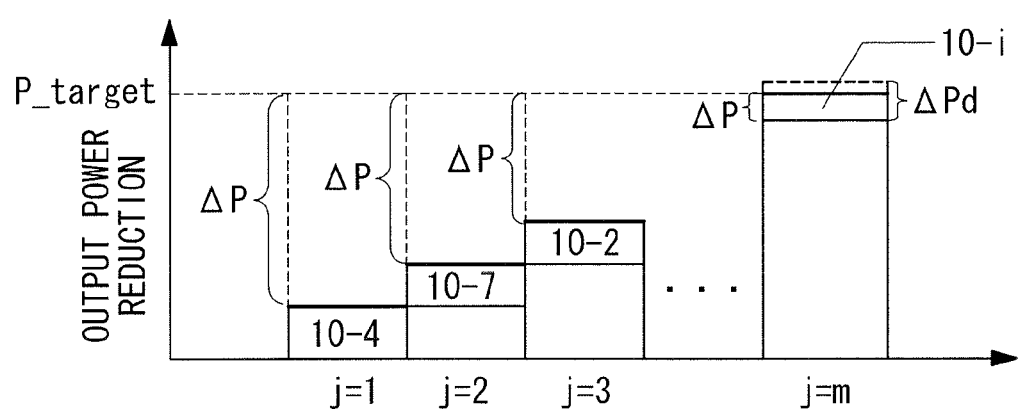
FIG. 7 is a diagram showing example priorities given to wind turbines.
FIG. 8 is a diagram showing the relationship between the output power reduction and first differences.

As a result, if the output power Pkws at the interconnection point A is equal to or smaller than the output-power limit value Pkwc ("NO" in Step SA1), the output-power reduction control is not necessary, and the processing ends. On the other hand, if the output power Pkws at the interconnection point A is larger than the output-power limit value Pkwc ("YES" in Step SA1), higher priorities are sequentially given to the wind turbines having larger output powers, based on the current output powers of the wind turbines 10-1, . . . , 10-n (Step SA2). FIG. 7 shows example priorities j. In FIG. 7, Priority 1 is given to a wind turbine 10-4, Priority 2 is given to a wind turbine 10-7, Priority 3 is given to a wind turbine 10-2, Priority m is given to a wind turbine 10-i, and Priority n is given to a wind turbine 10-k, for example.

Next, a first difference ΔP that is the difference between the output power Pkws at the interconnection point A and the output-power limit value Pkwc is calculated (Step SA3). Specifically, the first difference LP is expressed by Formula (1).

$$\Delta P = Pkws - Pkwc \tag{1}$$

Next, the wind turbine having the highest priority j (j=1), that is, the wind turbine 10-4, is selected as a target wind turbine (Step SA4). Then, a second difference ΔPd that is the difference between an output power Pkww(j) of the target wind turbine and the above-described preset minimum output-power value Pkww_min is calculated (Step SA5). Specifically, the second difference ΔPd is expressed by Formula (2).

$$\Delta Pd = Pkww(j) - Pkww\_min \tag{2}$$

Next, it is determined whether the second difference ΔPd is smaller than the first difference LP (Step SA6). If the second difference £Pd is smaller than the first difference ΔP ("YES" in Step SA6), the minimum output-power value Pkww_min is set in an output power command Pkwwo(j) for the wind turbine 10-4 serving as the target wind turbine, and the output power command Pkwwo(j) is output to the target wind turbine 10-4 (Step SA7). Thus, control in which the output power of the wind turbine 10-4 becomes the minimum output-power value Pkww_min is performed by the wind turbine control device 20.

Then, the value obtained by subtracting the second difference ΔPd from the first difference ΔP is set as a new first difference LP (Step SA8).

Then, the priority j is incremented by 1 (j=j+1), the wind turbine 10-7 having Priority 2 is set as the target wind turbine (Step SA9), and the flow returns to Step SA5. Thus, the same processing is performed for the wind turbine 10-7.

In this way, the processing from Step SA5 to Step SA9 is repeated sequentially for the wind turbines in descending order of priority until decision "NO" is obtained in Step SA6. The output power command that has the minimum output-power value Pkww_min is set sequentially for the higher-priority wind turbines 10-4, 10-7, 10-2, . . . . Thus, as shown in FIG. 8, output power reductions at the interconnection point A are accumulated, and the value of the first difference ΔP updated in Step SA8 of FIG. 6 gradually comes close to zero.

Figure 6:
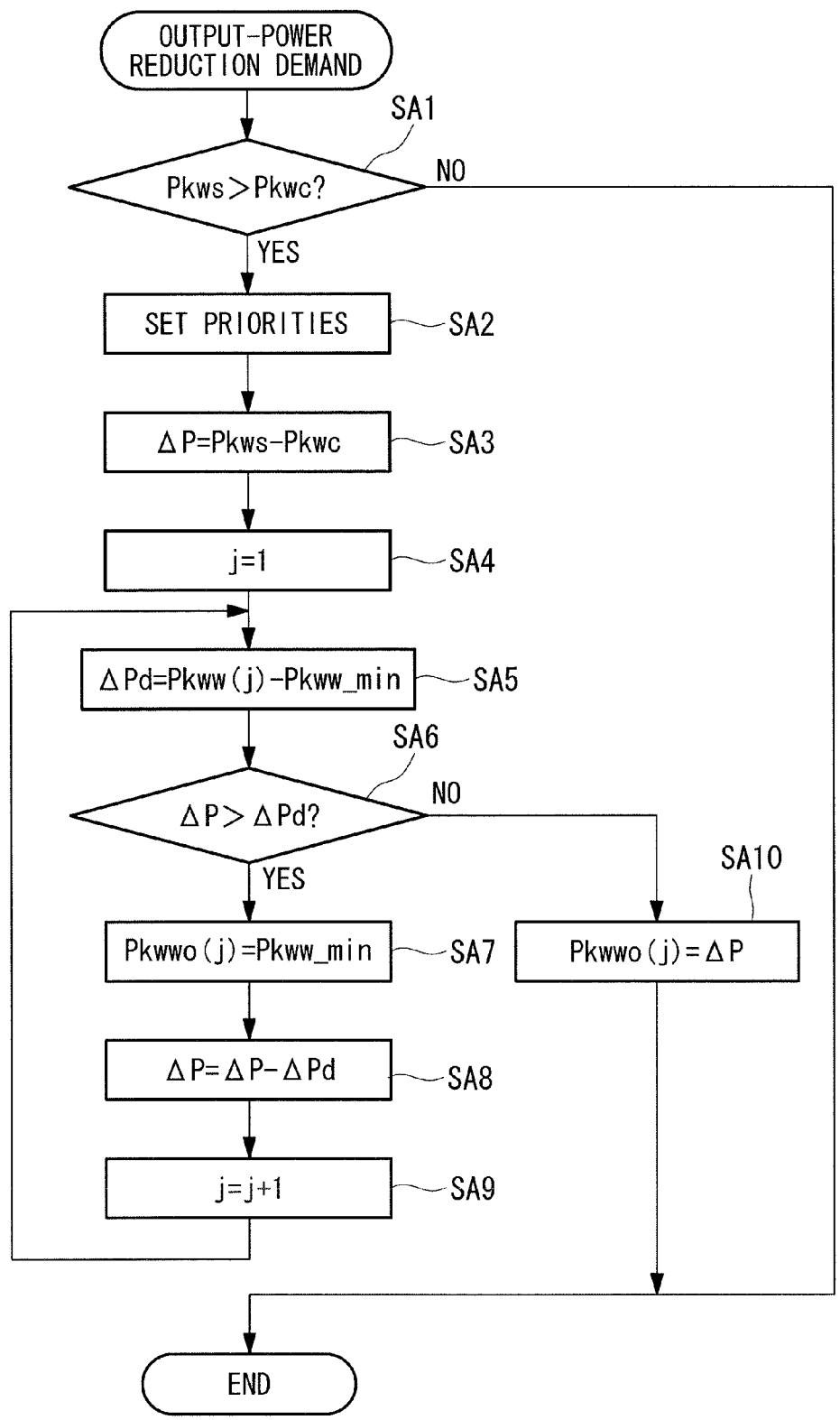
FIG. 6 is a flowchart for explaining a control method for the wind turbine generator system according to the embodiment of the present invention.

Then, as shown in FIG. 8, when the first difference ΔP becomes equal to or smaller than the second difference ΔPd for the wind turbine 10-i having Priority m, decision "NO" is obtained in Step SA6 of FIG. 6, the first difference LP at this point is set in the output power command Pkwwo(j) for the wind turbine 10-i serving as the target wind turbine, and the output power command Pkwwo(j) is sent to the wind turbine 10-i (Step SA10).

Thus, as shown in FIG. 8, the output power reductions of the wind turbines as a whole match a target output-power reduction P_target, that is, the initial first difference ΔP calculated in Step SA3 of FIG. 6. In other words, the output power at the interconnection point A matches the output power limit value.

In this way, when the output power at the interconnection point A matches the output power limit value notified from the electric power company control room, the central control system 2 ends the output-power reduction processing.

In this case, an output-power reduction command is not output from the central control system 2 to the rest of the wind turbines having priorities j lower than Priority m. Therefore, the same output power commands as those output before the output-power reduction demand is notified from the central control system 2 are output to the rest of the wind turbines. Thus, for the rest of the wind turbines having priorities j lower than Priority m, the same control as that performed before the notification is performed irrespective of whether the output-power reduction demand is notified.

As described above, according to the wind turbine generator system 1 and the control method therefor of this embodiment, when an output-power reduction demand for reducing the output power at the interconnection point A to the predetermined output-power limit value is notified from the utility grid side, higher priorities are given to the wind turbines having larger output powers, and the output power of each of the wind turbines is reduced to the preset minimum output-power value in descending order of priority until the output power at the interconnection point A reaches the output power limit value.

This minimum output-power value is set to an output power value that falls within an output power range in which the output power of the wind turbine is not reduced even if the wind speed drops. Therefore, even if the wind speed drops during the output-power reduction control, the wind turbine for which the output power command is set to have the minimum output-power value is unaffected by the drop in the wind speed. As a result, it is possible to suppress an output power reduction of the entire wind turbine generator system caused by the drop in wind speed.

Figure 9:
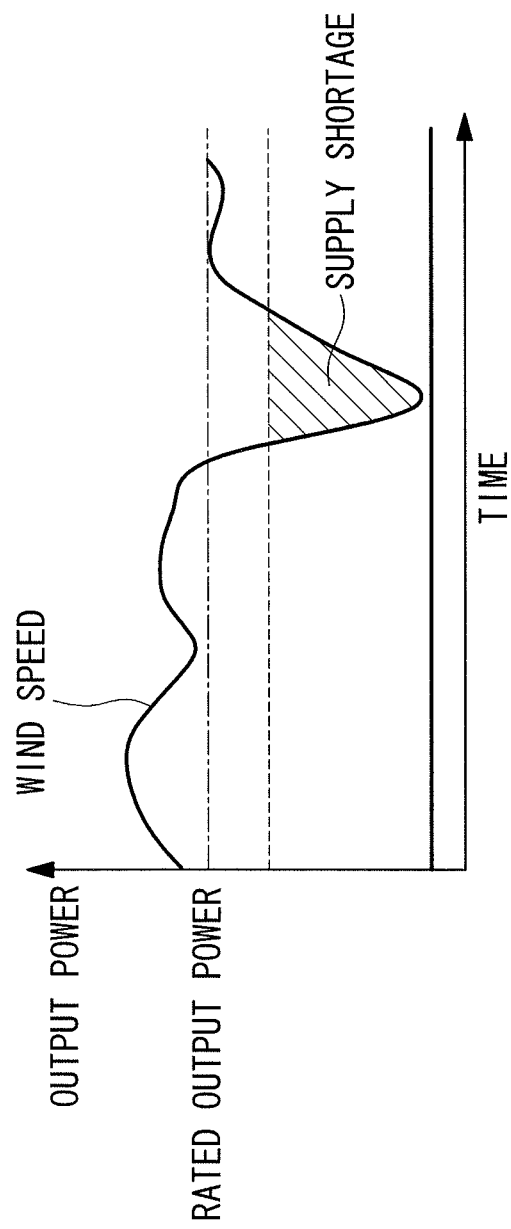
FIG. 9 is a diagram for explaining the advantageous effect of the present invention.

For example, after the output-power reduction demand is notified, if output power commands for reducing the output powers of all of the wind turbines 10 by predetermined amounts (for example, a dotted line in FIG. 9) are set, when the wind speed drops, the output powers of the wind turbines are reduced according to the drop in wind speed. As a result, the output power at the interconnection point A drops to the output power limit value or lower, thus causing a supply shortage (corresponding to a hatching region in FIG. 9).

However, according to the wind turbine generator system and the control method therefor of this embodiment, the output power commands for wind turbines that will be notably reduced in output power due to the drop in the wind speed, that is, for wind turbines having larger output powers, are preferentially reduced to the minimum output-power value. Since the minimum output-power value is set to a value that falls within an output power range in which the output power of the wind turbine is not changed according to the wind speed, as indicated by a solid line in FIG. 9, even when the wind speed drops, the output power of the wind turbine is unaffected by the drop in the wind speed.

Furthermore, since the output power commands for wind turbines whose output powers are not originally large, that is, for wind turbines having lower priorities, are not set to have the minimum output-power value, the wind turbines are affected by the drop in wind speed. However, the output powers of the wind turbines having lower priorities are lower than those of wind turbines having higher priorities, and therefore, the change in the output power caused by the drop in wind speed is small.

Therefore, according to the wind turbine generator system 1 and the control method therefor of this embodiment, it is possible to suppress an output power reduction of the entire wind turbine generator system caused by a drop in wind speed during the output-power reduction control.

In this embodiment, the output-power command setting section 32 sets an output power value ΔP for making the output power at the interconnection point A become the output power limit value, in the output power command for a target wind turbine for which decision "NO" is obtained in Step SA6 of FIG. 6, in other words, the wind turbine (in the above-described example, the wind turbine 10-*i*) that has a priority at which the output power at the interconnection point A becomes the output power limit value or smaller if the output power is reduced to the minimum output-power value. Instead of this, the minimum output-power value may be set for the wind turbine 10-*i*, as for the other wind turbines.

In this case, the output power reduction of the entire wind turbine generator system caused when the wind speed drops is increased compared with the case where the above-described output power value ΔP is set. However, even in this case, an advantage is afforded in that it is possible to suppress the output power reduction caused by a drop in the wind speed, compared with conventional techniques.

In this embodiment, when the output power command for the target wind turbine is set, the output power command is sent to the target wind turbine; however, instead of this, when the output power commands for all of the wind turbines are set, the output power commands may be sent to the wind turbines.

In this embodiment, the processing shown in FIG. 6 is performed only once when the output-power reduction demand is notified. However, the processing shown in FIG. 6 may be repeatedly performed at predetermined time intervals over a period of time from when the output-power reduction demand is notified until the output-power reduction demand is cancelled. By doing so, it is possible to set the output power command for an appropriate wind turbine to have the minimum output-power value according to the wind conditions at that moment, and to achieve a further improvement in the accuracy of output power control.

REFERENCE SIGNS LIST 1 wind turbine generator system
10-1, 10-*n* wind turbines
2 central control system
3 utility grid
20 wind turbine control device
31 priority setting section
32 output-power command setting section
A interconnection point

The invention claimed is:

1. A wind turbine generator system equipped with a plurality of wind turbines, in which output power from the wind turbines is supplied to a utility grid via a common interconnection point, the wind turbine generator system comprising:
an output power information section having output power information of each of the wind turbines;
a priority setting section that sets priorities of the wind turbines in which the output power is to be reduced, the priority setting section receiving the output power information from the output power information section and providing higher priorities to the wind turbines whose output powers are larger when an output-power reduction demand to reduce the output power at the interconnection point to a predetermined output-power limit value is notified from the utility grid side; and
an output-power command setting section that sets an output power of each of the wind turbines to be reduced to a predetermined minimum output-power value in a descending order of priority based on information from the priority setting section, said output-power command setting section reducing the output power based on output-power commands for the wind turbines sequentially in descending order of priority until the output power at the interconnection point reaches the output power limit value,
wherein the minimum output-power value is set to zero or a minimum output-power value at which the wind turbine can be continuously operated.

2. A wind turbine generator system according to claim 1, wherein, for the wind turbine that has a priority at which the output power at the interconnection point becomes the output power limit value or smaller if the output power is reduced to the minimum output-power value, the output-power command setting section sets an output power command value for making the output power at the interconnection point become the output power limit value.

3. A wind turbine generator system according to claim 1, wherein, when the output-power reduction demand is notified, the output-power command setting section calculates a first difference that is the difference between the output power at the interconnection point and the output power limit value and sets the output power commands having the minimum output-power value for the wind turbines sequentially in descending order of priority such that the first difference becomes zero.

4. A wind-turbine-generator-system control method for a wind turbine generator system equipped with a plurality of wind turbines, in which output power from the wind turbines is supplied to a utility grid via a common interconnection point, the method comprising:
a priority setting step of setting priorities such that higher priorities are given to the wind turbines whose output powers are larger, when an output-power reduction demand to reduce the output power at the interconnection point to a predetermined output-power limit value is notified from the utility grid side; and
an output-power command setting step of setting a predetermined minimum output-power value in output power commands for the wind turbines sequentially in descending order of priority, until the output power at the interconnection point reaches the output power limit value,
wherein the minimum output-power value is set to zero or a minimum output-power value at which the wind turbine can be continuously operated.

5. A wind-turbine-generator-system control method according to claim 4, wherein, in the output-power command setting step, for the wind turbine that has a priority at which the output power at the interconnection point becomes the output power limit value or smaller if the output power is reduced to the minimum output-power value, an output power command value for making the output power at the interconnection point become the output power limit value is set.

6. A wind-turbine-generator-system control method according to claim 4, wherein, in the output-power command setting step, when the output-power reduction demand is notified, a first difference that is the difference between the output power at the interconnection point and the output power limit value is calculated, and the output power commands having the minimum output-power value are set for the wind turbines sequentially in descending order of priority such that the first difference becomes zero.

7. A wind-turbine-generator-system control method for a wind turbine generator system equipped with a plurality of wind turbines, in which output power from the wind turbines is supplied to a utility grid via a common interconnection point, the method comprising:

an output power information receiving step of receiving output power information of each of the wind turbines;

a priority setting step of setting priorities of the wind turbines in which the output power is to be reduced, the priority setting step receiving the output power information from the output power information section and providing higher priorities to the wind turbines whose output powers are larger when an output-power reduction demand to reduce the output power at the interconnection point to a predetermined output-power limit value is notified from the utility grid side; and an output-power command setting step of setting an output power of each of the wind turbines to be reduced to a predetermined minimum output-power value in a descending order based on information from the priority setting step, said output-power command setting step reducing the output power based on output power commands for the wind turbines sequentially in descending order of priority until the output power at the interconnection point reaches the output power limit value, wherein the minimum output-power value is set to zero or a minimum output-power value at which the wind turbine can be continuously operated.

* * * * *